Patented July 2, 1935

UNITED STATES PATENT OFFICE 2,006,610

PRODUCTION OF SOLUBLE SALTS OF BARBITURIC ACIDS

Donalee L. Tabern and Norman A. Hansen, Lake Bluff, Ill., assignors to Abbott Laboratories, North Chicago, Ill., a corporation of Illinois No Drawing. Application June 2, 1932, Serial No. 615,025

13 Claims. (Cl. 260—33)

For certain purposes, it is desirable to administer barbituric acids in soluble form, as, for example, for intravenous or rectal administration. For such purposes, the relatively water-insoluble barbituric acids themselves are unsuitable. When so administered, the salts of barbituric acid derivatives exert their effects more promptly and desirably than do the products administered orally in the form of the barbituric acids.

It is known that 5,5-di-substituted barbituric acids are soluble in solutions of alkali-metal hydroxides or alcoholates, forming thereby the corresponding alkali-metal salts. However, the solutions so prepared are unstable, there being produced decomposition products of the barbituric acids, causing the hypnotic and sedative efficiency to be markedly decreased and possibly leading to undesirable side effects in clinical use. It is therefore desirable to isolate the salts of the barbituric acids in solid form and they may thus be kept in pure form until they are used. To obtain the solid sodium salts from solutions thereof, it is possible to evaporate the aqueous solutions of soluble salts of barbituric acids to dryness, providing the operation is carried out very carefully with high vacuum. This method is not economical or desirable from the manufacturing standpoint, however, and has certain technical disadvantages.

Another method which has been suggested consists in preparing the salt of the barbituric acid derivative in alcoholic or aqueous-alcoholic solution and evaporating to dryness. While superior to the aqueous method, it nevertheless is not entirely satisfactory because when some water is present in the organic liquid, some hydrolysis of the barbituric acid compound may occur, and the product may also become discolored and impure due to the fact that the solution is evaporated completely to dryness.

We have discovered that all of the above disadvantages may be overcome by first dissolving the barbituric acid in an organic solvent such as an aliphatic alcohol or ketone (for example, ethyl alcohol or acetone) and then adding the alkali metal in solution, preferably as the ethyl alcoholate. In one embodiment of our invention, where a ketone has been used as the solvent for the acid, the alkali salt separates on the addition of the alcoholate, because of the salt's insolubility in the ketone, and may be readily filtered off. In another embodiment, where the acid has been dissolved in an alcohol, the alkali salt may be separated, after addition of the alcoholate and consequent formation of the salt in solution, by adding thereto a liquid hydrocarbon miscible in the alcohol.

The sodium salt of the barbituric acid derivative is thereby precipitated from solution, and may be directly filtered off and dried.

The salts are by both procedures obtained in an entirely pure, white, completely soluble condition.

The salts so obtained have the general formula:

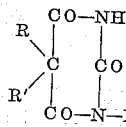

in which R and R' represent aliphatic, alicyclic, or aromatic groups, and X represents an alkali metal, such as sodium, potassium, or lithium.

EXAMPLE 1

*Sodium diethylbarbiturate*

To 185 grams diethylbarbituric acid dissolved in 750 cc. ethyl alcohol is added a solution of sodium ethylate prepared by dissolving 23 grams of sodium in 300 cc. ethyl alcohol. To the solution so obtained is added 500 cc. benzene, which causes the sodium salt of diethylbarbituric acid to crystallize from solution in good yield. The salt is filtered off and dried. It is pure white and dissolves readily and completely in water.

Instead of ethyl alcohol, methyl alcohol or acetone may be employed to dissolve the diethylbarbituric acid in the above example, and the sodium may be dissolved in another alcohol, such as methyl or propyl alcohol.

EXAMPLE 2

*Sodium phenyl ethyl barbiturate*

23 grams sodium is dissolved in 500 cc. absolute alcohol and the solution is filtered. In 800 cc. warm absolute alcohol is dissolved 232 grams phenyl ethyl barbituric acid, and the solution is filtered. The two solutions are mixed, and 300 cc. petroleum ether, hexalin or tetralin, is added. Sodium phenyl ethyl barbiturate crystallizes from solution and is filtered off and dried.

EXAMPLE 3

*Potassium salt of phenyl ethyl barbituric acid*

Same method as Example 2, but using 39 grams potassium.

EXAMPLE 4

*Sodium ethyl-(1-methyl butyl) barbiturate*

23 grams of sodium is dissolved in 400 cc. of anhydrous alcohol; the solution is cooled and 226 grams of ethyl-(1-methyl butyl) barbituric acid is added and allowed to dissolve; the solution is filtered and to the filtrate is added 750 cc. benzene. The sodium ethyl-(1-methyl butyl) barbiturate precipitates, first as a slightly pasty material which quickly becomes granular. It is filtered, washed with benzene, and dried. Instead of benzene, it is possible to employ other hydrocarbons such as toluene, xylene, or petroleum ether, to bring about the precipitation of the pure salt.

EXAMPLE 5

Sodium ethyl-(1-methyl heptyl) barbiturate 23 grams sodium is dissolved in 300 cc. alcohol. To this solution is added a solution of 269 grams of ethyl-(1-methyl heptyl) barbituric acid in 800 cc. alcohol. To the mixed alcoholic solution is added 1000 cc. benzene, which precipitates the sodium salt of the barbituric acid. The product is filtered and dried.

EXAMPLE 6

Sodium ethyl-(1-ethyl propyl) barbiturate

The sodium salt may be prepared by a method similar to that given in Example 5.

EXAMPLE 7

Sodium ethyl secondary butyl barbiturate

This sodium salt is prepared by the same method as given in the preceding examples.

EXAMPLE 8

Sodium diallyl barbiturate

The method of preparation is the same as given in the preceding examples.

EXAMPLE 9

Sodium secondary butyl allyl barbiturate

Same method as in preceding examples.

EXAMPLE 10

Lithium diethyl barbiturate

Same as Example 1 but using 7 grams of lithium in place of sodium.

EXAMPLE 11

Sodium ethyl cyclopentyl barbiturate

Same method as in preceding examples.

EXAMPLE 12

Sodium ethyl cyclohexenyl barbiturate

Same method as in preceding examples.

EXAMPLE 13

Sodium n-butyl ethyl barbiturate 2.3 grams sodium is dissolved in 50 cc. alcohol. 22 grams of n-butyl ethyl barbituric acid is dissolved in 100 cc. acetone. The separate solutions are filtered, then warmed slightly and mixed. Sodium n-butyl ethyl barbiturate crystallizes from solution as a white granular product completely soluble in water and alcohol.

The salts of barbituric acids so obtained are white, stable, readily water-soluble compounds which are entirely suitable for therapeutic use. The salts vary in their solubility in alcohol, but are practically insoluble in hydrocarbons and in ether and acetone.

Various modifications may doubtless be made in our invention without departing from the spirit thereof, and hence we do not wish to be limited to the specific procedure outlined or uses mentioned, but wish the scope of our invention to be determined entirely from the appended claims, which are to be interpreted as broadly as is consistent with the state of the art.

We claim as our invention:

1. A method of preparing in solid form an alkali-metal salt of a barbituric acid of the formula—

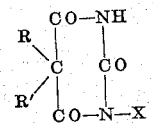

in which R and R' represent aliphatic, alicyclic, or phenyl radicals, and X represents an alkali-metal, which comprises dissolving the barbituric acid in an organic solvent, which is inert to said barbituric acid, adding to said solution an alkali metal in the form of its alcoholate, and forming the alkali metal salt of said acid as a precipitate by the presence of a relatively large proportion of a liquid in which it is insoluble, said liquid being a member of the group consisting of inert alkyl ketones and insert liquid hydrocarbons.

2. A method as defined in claim 1, wherein said liquid is a solvent for said acid.

3. A method of preparing in solid form an alkali-metal salt of a barbituric acid of the formula—

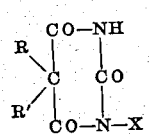

in which R and R' represent aliphatic, alicyclic, or phenyl radicals, and X represents an alkali-metal, which consists in dissolving the barbituric acid in an organic solvent which is inert to said barbituric acid and in which the alkali metal salts of said acid are insoluble, and adding to said solution an alkali metal in the form of its alcoholate, whereby the alkali salt of said acid will be formed and will precipitate from said solution.

4. A method as defined in claim 3, wherein said solvent is an alkyl ketone.

5. A method as defined in claim 3, wherein said solvent is acetone.

6. A method of preparing in solid form an alkali-metal salt of a barbituric acid of the formula—

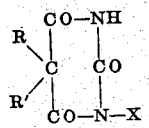

in which R and R' represent aliphatic, alicyclic, or phenyl radicals, and X represents an alkali-metal, which consists in forming the salt of the barbiturate in solution in an inert organic solvent, and precipitating it from the solution by means of a liquid hydrocarbon.

7. A method of preparing an alkali-metal salt of a barbituric acid of the formula—

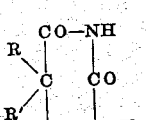

in which R and R' represent aliphatic, alicyclic, or phenyl radicals, and X represents sodium, which comprises forming the sodium salt in an inert organic solvent, and precipitating it from the solution by means of a liquid hydrocarbon.

8. A method as described in claim 6, wherein R represents an ethyl group, R' represents aliphatic, alicyclic, or phenyl radical, and X represents sodium.

9. A method as described in claim 6, in which R represents ethyl, R' represents the 1-methyl butyl group, and X represents sodium.

10. A method as described in claim 6 in which the organic solvent is alcohol and in which the liquid hydrocarbon is benzene.

11. A method of preparing in solid form an alkali-metal salt of a barbituric acid of the formula—

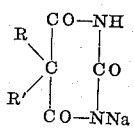

in which R and R' represent aliphatic, alicyclic, or phenyl radicals, which consists in forming such salt in alcoholic solution and adding thereto benzene to precipitate the salt.

12. A method of preparing in solid form the sodium salt of ethyl-(1-methyl-butyl) barbituric acid, having the formula—

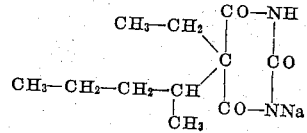

which comprises forming said salt in alcoholic solution and adding thereto benzene to precipitate the salt.

13. A method of preparing in solid form the sodium salt of ethyl-(1-methyl-butyl) barbituric acid, having the formula—

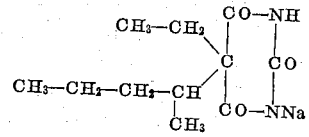

which consists in forming said salt in ethyl alcoholic solution and adding thereto petroleum ether to precipitate the salt.

DONALEE L. TABERN.
NORMAN A. HANSEN.

CERTIFICATE OF CORRECTION.

Patent No. 2,006,610.                                                                   July 2, 1935.

DONALEE L. TABERN, ET AL.

It is hereby certified that error appears in the printed specification of the above numbered patent requiring correction as follows: Page 2, second column, line 24, claim 1, for "insert" read inert; and that the said Letters Patent should be read with this correction therein that the same may conform to the record of the case in the Patent Office.

Signed and sealed this 6th day of August, A. D. 1935.

Leslie Frazer (Seal)                                                 Acting Commissioner of Patents.